June 2, 1959  A. L. MOTTET  2,889,030
WEIGHING BELT

Filed Aug. 17, 1953  4 Sheets-Sheet 1

INVENTOR.
Arthur L. Mottet
BY Eugene D. Farley
Atty.

June 2, 1959     A. L. MOTTET     2,889,030
WEIGHING BELT

Filed Aug. 17, 1953     4 Sheets-Sheet 3

Fig. 3.

INVENTOR.
Arthur L. Mottet
BY
Atty.

United States Patent Office 2,889,030
Patented June 2, 1959

2,889,030
WEIGHING BELT

Arthur L. Mottet, Longview, Wash., assignor, by mesne assignments, to International Paper Company, New York, N.Y., a corporation of New York Application August 17, 1953, Serial No. 374,541

21 Claims. (Cl. 198—39)

This invention pertains to apparatus for weighing materials in bulk form, and relates particularly to a weighing belt for continuously weighing bulk material deposited thereon for delivery to a subsequent stage of processing.

In certain applications it is desirable to provide for the feeding of bulk material gravimetrically at a uniform rate for subsequent processing operations. For example, in the manufacture of pressed fiberboard by the dry process, wood first is reduced to fibrous form and then passed continuously through apparatus for coating it with resin, forming it into felts or mats, and pressing it into fiberboard of a selected density. In order to operate the process satisfactorily and in order to obtain mats and fiberboards of uniform density it is necessary that the fiber be fed into the various processing units at a constant rate.

This desired result is difficult of accomplishment because the rate of fiber production usually is not constant. Also, the character of the fiber is such that it tends to clump together and form flocs, thereby resulting in a continuous flow of material which varies substantially in density. As a result, the various means which have been provided heretofore have not been completely satisfactory in achieving the precision of control necessary to the production of fiberboards of uniform density.

Accordingly, it is a principal object of the present invention to provide a weighing belt which operates in cooperation with an electrically controlled feeding mechanism for automatically controlling the volumetric output of the feeding mechanism.

Another important object of this invention is the provision of a weighing belt which functions continuously to weigh bulk material deposited thereon and intermittently to adjust the feeding mechanism in response to variations in weight of material deposited upon the belt.

A further important object of the present invention is the provision of a weighing belt which functions to control the volume of bulk material deposited thereon with precision while simultaneously conveying the bulk material to a subsequent station at a uniform rate.

The foregoing and other objects and advantages of the present invention will appear from the following detailed description taken in connection with the accompanying drawings, in which.

Figure 2:
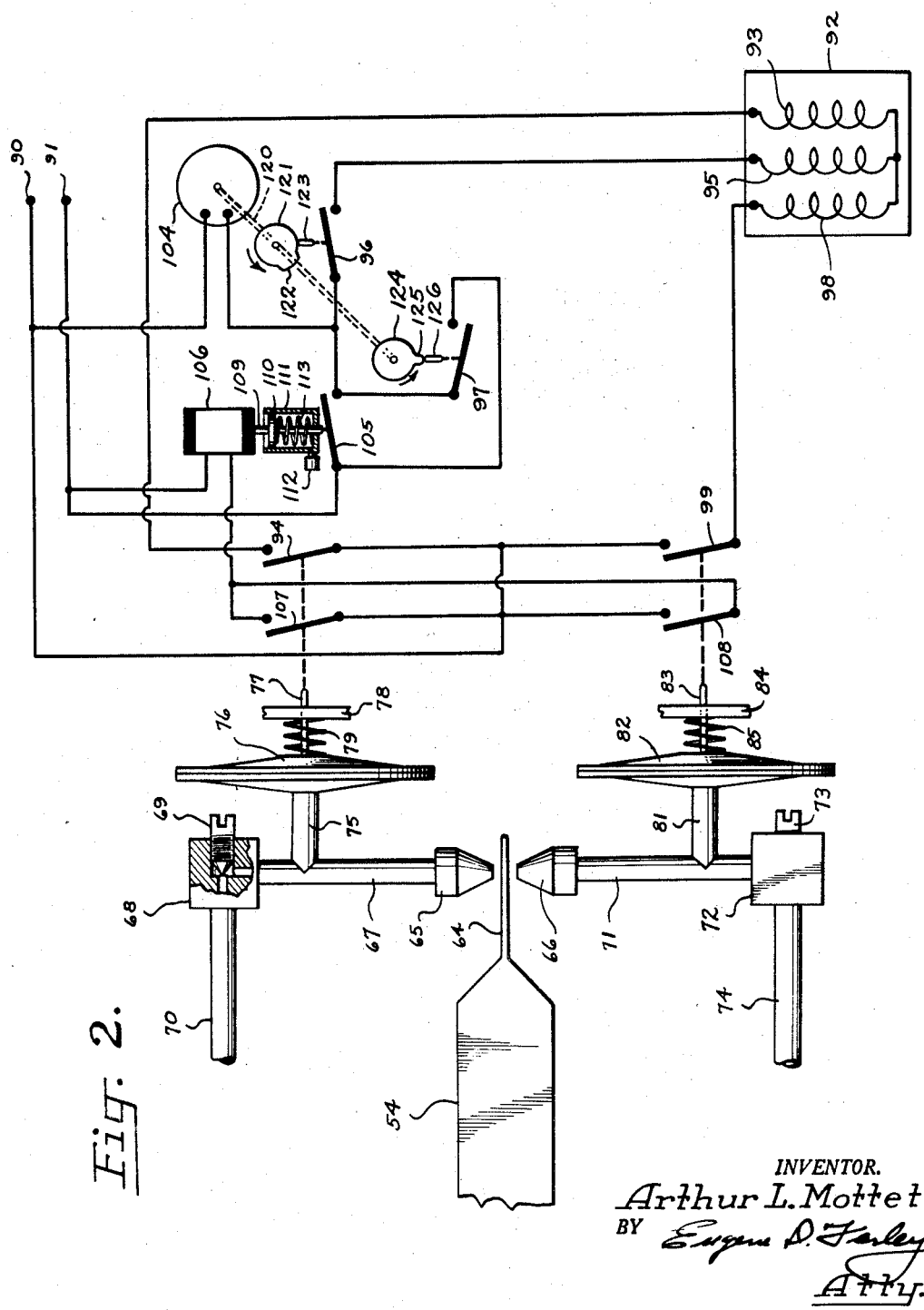
Figure 2 is a diagrammatic view showing one form of electrical circuitry and actuating mechanism associated with the weighing belt for controlling the operation of an electrically controlled feeding mechanism.
Figure 4:
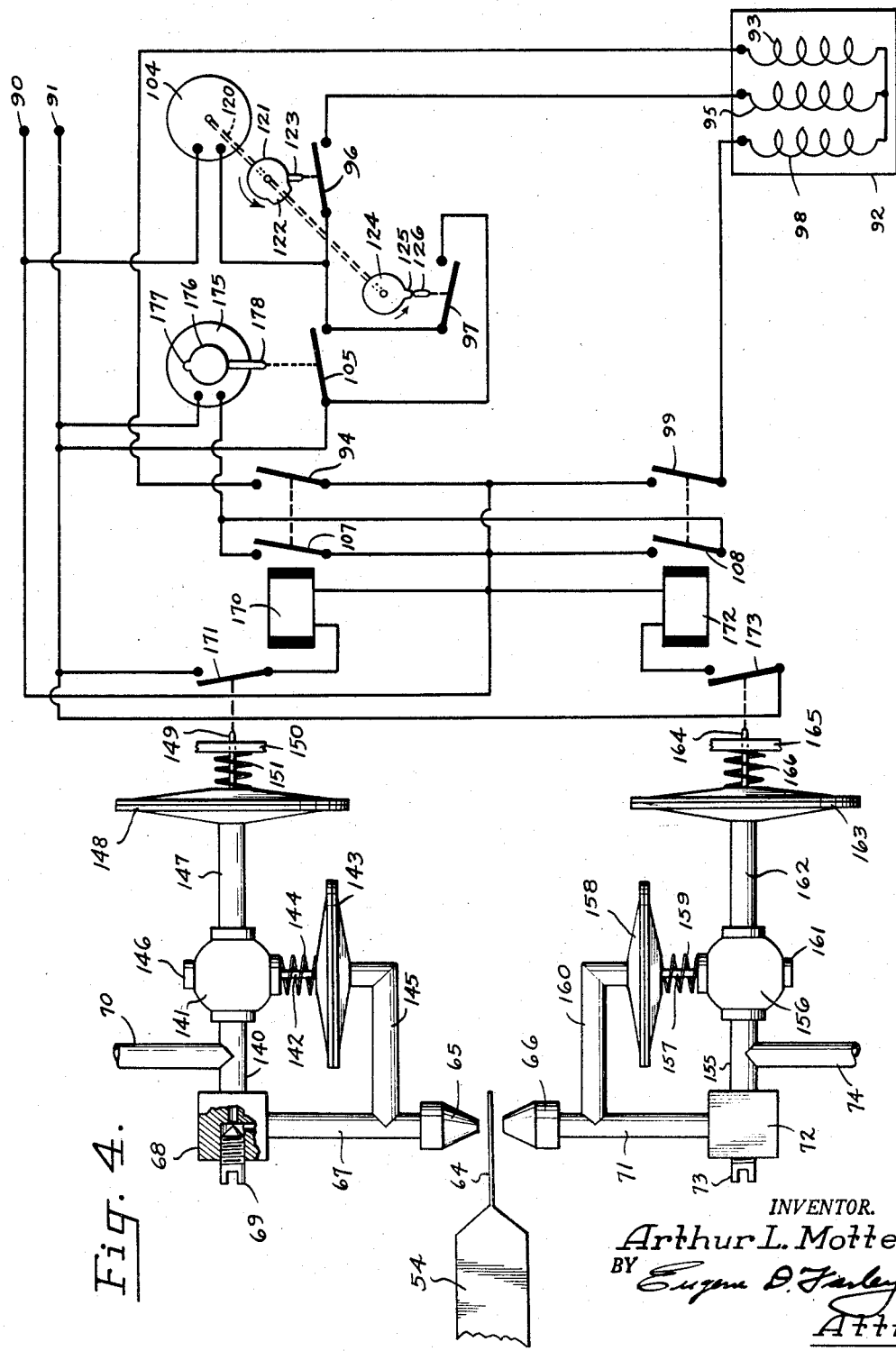

Figure 3 is a diagrammatic view similar to Figure 2 showing a modified form of electrical circuitry and actuating mechanism associated with the weighing belt of the present invention for controlling the operation of an electrically controlled feeding mechanism; and Figure 4 is a diagrammatic view of a still further modified form of electrical circuitry and related actuating mechanism associated with the weighing belt for controlling the operation of an electrically controlled feeding mechanism.

Figure 1:
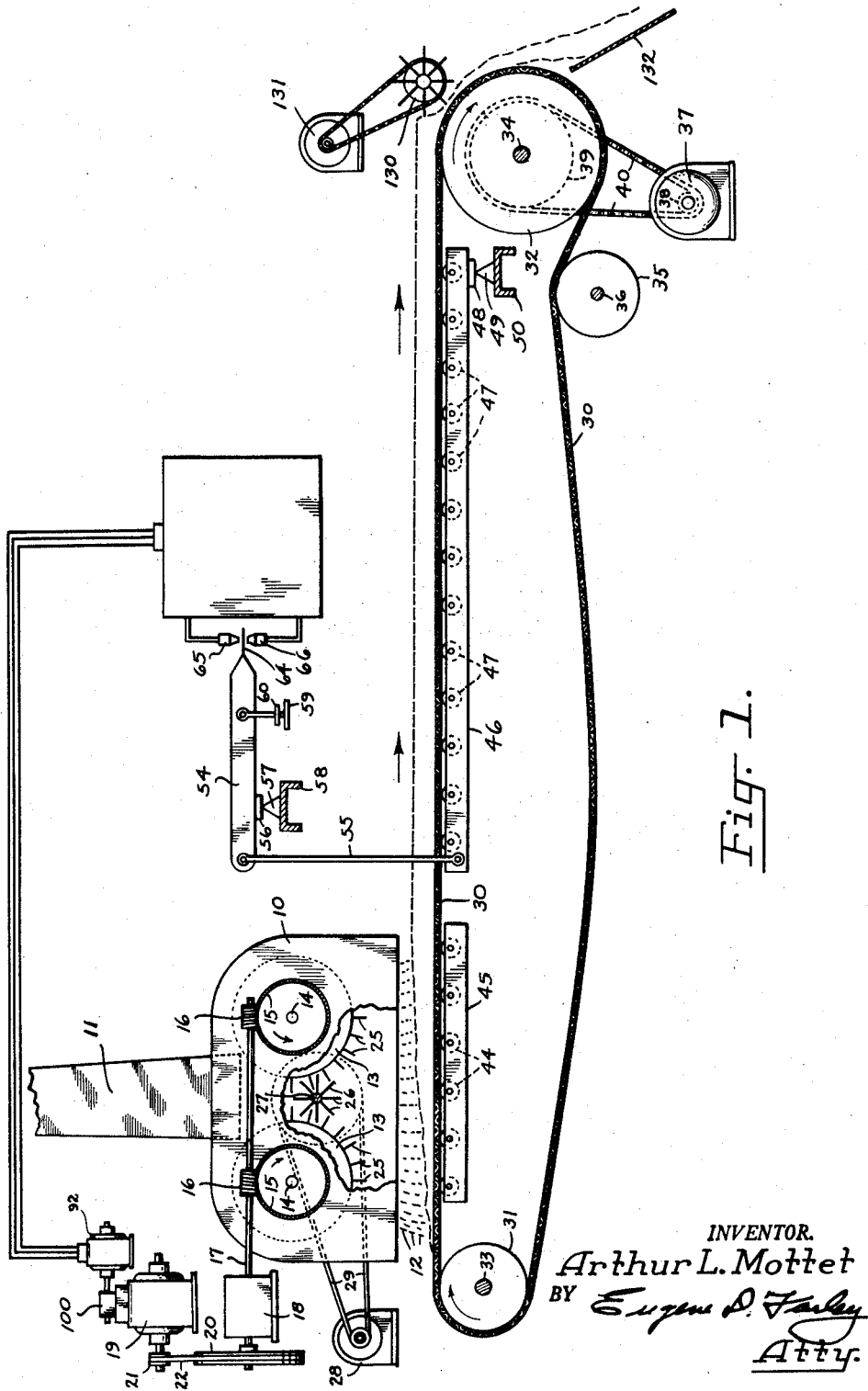
Figure 1 is a view in side elevation showing the general arrangement of a feeding belt embodying the features of this invention in operative cooperation with electrically controlled feeding mechanism.

Referring to Figure 1 of the drawings, there is shown for purposes of illustration a feeding mechanism which includes a housing 10, the top of which communicates with a feed chute 11 through which the bulk material, such as the wood fibers 12, is passed downwardly to a pair of spaced feed rolls 13 each mounted on a shaft 14 rotatably supported in the sides of the housing 10. Secured to each of the shafts 14 is a worm gear 15, each of which meshes with a worm 16 secured to shaft 17. Shaft 17 is driven through gear box 18 which is interconnected with the electric drive motor 19 by means of the pulleys 20, 21 and drive belt 22.

The feed rolls 13 are provided with a plurality of outwardly projecting spikes 25 which function to carry the bulk fibrous material from chute 11 into the area between the rolls 13. Here the fibers are compressed and subjected to the combing action of the spikes 26 projecting from the shaft 27 rotatably mounted within housing 10 between the rolls 13. This shaft is driven at a constant rate of speed by means of motor 28 to which it is connected by means of belt 29.

As a result of the initial compression of the fibers by rolls 13 and the subsequent combing of the compressed fibers by the spikes 26, the individual fibers are separated from the clumps and dispersed uniformly as they emerge from the combing spikes 26. The dispersion of fibers thus provided is now ready for transmittal to a resin mixer or other apparatus by means of the weighing belt of the present invention, now to be described.

An endless belt 30 is reeved over spaced rollers 31 and 32 mounted on shafts 33, 34, respectively. The bottom run of the belt 30 is preferably supported adjacent roll 32 by means of roller 35 mounted for rotation on shaft 36. The endless belt is driven at a constant rate by means of electric motor 37 which is interconnected with shaft 34 by means of the respective pulleys 38 and 39 and drive belt 40.

The rearward end of belt 30, i.e. the end adjacent roll 31, is disposed below the feeding mechanism 10. This rearward section of the belt is supported in a horizontal plane by means of a plurality of rollers 44 which are supported for rotation on the frame 45.

A second frame 46 is positioned forwardly of the first frame 45 and supports a plurality of spaced rollers 47. The forward end of the frame 46 is provided with a pivot block 48 which rests upon the pivot edge 49 supported by frame 50. The rearward end of frame 46 is pivotally interconnected to a scale beam 54 by means of link 55. The scale beam is also provided with a pivot block 56 which rests upon the pivot edge 57 supported by frame 58. Suspended freely from the scale beam 54 on the side of the pivot edge 57 opposite the link 55 is a weight holder 59 adapted to removably receive thereon a plurality of weights 60 for balancing the scale beam 54 and supporting the rearward end of frame 46. Frame 46 is thus supported in a horizontal plane, with the rollers 47 engaging the underside of the top run of endless belt 30.

The free end of scale beam 54 is provided with a flat valve plate 64 which is positioned between the air nozzles 65 and 66. Referring now to Figure 2 of the drawings, these nozzles are connected to a source of compressed air as follows: Nozzle 65 is connected through pipe 67 to valve 68 provided with needle valve 69, which controls the amount of air admitted through pipe 70 from an air supply, not shown. In like manner, nozzle 66 is connected through pipe 71 to valve 72 provided with needle valve 73 which regulates the amount of air admitted through pipe 74 from the air supply.

Communicating with pipe 67 is pipe 75, the outer end of which is connected to one side of a pneumatically actuated diaphragm 76. The opposite side of the diaphragm carries a rod 77, the free end of which is supported slidably in a frame member 78. A compression spring 79 is interposed between the diaphragm 76 and the frame member 78 to normally urge the diaphragm and rod 77 away from the frame member 78.

In a similar manner, pipe 81 communicates at one end with pipe 71 and at the opposite end with one side of diaphragm member 82. The opposite side of the diaphragm member carries rod 83 the free end of which is supported slidably in frame member 84. Compression spring 85 encircles rod 83 between the diaphragm 82 and frame member 84 for purposes of normally urging the diaphragm and rod away from the frame member 84.

The electrical circuitry energized by operation of the diaphragms and rods when extended is as follows: A source of electrical supply is shown provided at terminals 90 and 91. This supplies current to a reversible control motor 92, which controls the speed of drive motor 19 and hence of feed rolls 13. The electrical circuit of the reverse winding 93 of motor 92 extends from terminal 90 through switch 94, through the reverse winding 93 and thence through the common winding 95, through switch 96 and 97 to terminal 91. The electrical circuit of the forward winding 98 of control motor 92 extends from terminal 90 through switch 99 and the forward winding 98, through the common winding 95 and switches 96 and 97 to terminal 91.

As shown in Figure 1 of the drawings, the control motor 92 functions to control the variable speed motor 19. This may be accomplished in various ways, for example by utilizing drive motor 92 to operate a variable resistance unit 100 in the electric circuit of the drive motor 19.

To compensate for the substantial time period elapsing between deposit of the fiber on the slowly travelling belt 30 and their conveyance to the weighing section of the apparatus, adjustment of volumetric feeding from the feeder 10 is accomplished in a step-wise manner by the intermittent adjustment of the variable speed motor 19. This prevents overrunning of adjustment as variations in weight upon the travelling belt 30 actuate the scale beam 54. This intermittent operation is provided in the modification shown in Figure 2 as follows: A timing motor 104 is connected between terminals 90 and 91 through switch 105. This switch is actuated by means of a solenoid 106 connected between terminals 90 and 91 through either of the switches 107 or 108. The actuating shaft 109 of solenoid 106 is provided with a piston 110 which is slidable longitudinally in cylinder 111. The cylinder is provided with an air bleeder valve 112 below the piston, whereby to delay the downward movement of the piston by restricting the escape of air therefrom to the extent required. A compression spring 113 extends between the piston 110 and the bottom of cylinder 111 for returning the piston and solenoid rod 109 to retracted positions upon deactivation of the solenoid 106. By means of the foregoing delay solenoid, actuation of timing motor 104 may be delayed for any desired period of time to compensate for the hunting tendency of scale beam 54.

The drive shaft 120 of timing motor 104 carries a cam 121, a section 122 of which forms an outward projection. The switch button 123 of microswitch 96 is arranged to engage the cam 121 in such manner that the switch is closed for the period of time during which the button is engaged by the projection 122 and open during the remaining portion of the cam cycle. Thus, control motor 92 will be energized only during the time when projection 122 closes the switch 96. It is during this period of time that control motor 92 is capable of adjusting the rheostat 100 to change the speed of the variable drive motor 19.

In order to insure the operation of control motor 92 for a definite period of time determined by the projection 122, a second cam 124 is secured to the drive shaft 120 of the timer motor 104. This cam is provided with an outward projection 125, preferably of short circumferential length. The actuating button 126 of microswitch 97 is adapted to engage cam 124 in such manner that when actuated by the projection 125 the microswitch 97 is opened. During the remaining portion of the cycle of cam 124, the microswitch 97 is closed.

It is to be noted that microswitch 97 is arranged in parallel with the delay controlled switch 105. Thus, timer motor 104 is actuated first by the delayed closing of switch 105. Upon rotation of shaft 120 to remove the cam projection 125 from engagement with microswitch button 126, microswitch 97 is closed, thereby maintaining the circuit of the timer motor 104 after the delay controlled switch 105 has opened. Thus, timer motor 104 will continue to be energized until the cam projection 125 again engages the button 126 to open microswitch 97 and thus break the circuit of the timer motor 104. In this manner the timer motor is returned to a definite starting position after each cycle of operation, and cam 121 is thereby returned to a definite starting position, as indicated in Figure 2, from which to provide a definite closing itme for microswitch 96 to actuate the control motor 92.

The operation of the weighing belt and the associated mechanism illustrated in Figure 2 and described in detail hereinbefore is as follows: While the endless belt 30 is empty the scale beam 54 is balanced by adjusting the weight 60 suspended therefrom until the valve 64 is positioned equidistant between the nozzles 65 and 66. In this position the frame 46 extends in a horizontal plane with the rollers 47 engaging the under side of the endless belt 30. Variable speed motor 19 and combing roll motor 28 are then energized to actuate the feeding mechanism 10, whereupon the fibrous material 12, for example, is dispensed at a certain rate upon the moving belt 30. As this material passes toward the forward end of the conveyor belt, in the direction of the forward roll 32, the balance of scale beam 54 is adjusted until it is balanced with the desired weight of material carried on belt 30.

In the event that feeder 10 deposits a greater quantity of fiber 12 upon the belt than is desired, beam 46 is thereby caused to swing downwardly in a counterclockwise manner about the pivot edge 49 and the scale beam 54 is simultaneously rotated in a counterclockwise direction about pivot edge 57 to bring the valve 64 in contact with the open end of nozzle 65. Compressed air then is admitted through pipe 70 and needle valve 69 to pipe 67. The quantity of air so admitted to pipe 67 is very small, however, and the air pressure at nozzle 65 is substantially zero when valve 64 is out of contact therewith. When this valve closes nozzle 65, however, the air pressure in pipe 67 rapidly increases to the pressure of the air supply and this air pressure is thereupon exerted upon the diaphragm 76 to move rod 77 outwardly therefrom, i.e. to the right in Figure 2.

Rod 77 is connected to switches 94 and 107 and closes them as it moves toward the right. Thus, the circuit of the delay relay 106 is closed and the piston 110 attached to solenoid rod 109 begins to move in cylinder 111 toward the air bleeder valve 112. This valve is adjusted to provide the desired time delay, which may be varied over a substantial range, for example from one second to 30 seconds. After the desired time delay, switch 105 connected to solenoid rod 109 is closed, thereby completing the electric circuit of timer motor 104.

Assuming that cams 121 and 124, driven by timer motor 104 as explained hereinbefore, are set at the starting position illustrated in Figure 2, the energization of the timer motor causes cam projection 122 to close microswitch 96, while the removal of cam projection 125 from the actuating button on microswitch 97 closes the latter.

With the closing of microswitch 97 the circuit of timer motor 104 is maintained completed for one cycle of revolution of cam 124, as explained hereinbefore. With the closing of microswitch 96 the circuit of the reverse winding 93 of control motor 92 is maintained completed for that proportion of a revolution of timer motor 104 determined by the width of the cam projection 122. Thus, during this period of time control, motor 92 is actuated in its reverse direction to drive the variable resistance 100 and slow down the speed of the variable drive motor 19, correspondingly reducing the amount of fiber 12 being fed through the feed mechanism 10 onto the endless belt 30.

After the cam projection 122 has passed from contact with the actuating button 123 of microswitch 96, the latter is opened and the circuit of the reverse winding 93 of control motor 92 is opened. Timer motor 104 continues to operate, however, until cam projection 125 again engages the actuating button 126 of microswitch 97 to open the latter and de-energize the timer motor.

In the event that the amount of fiber 12 deposited upon the belt 30 is still in excess of the quantity desired, scale beam 54 will still be tilted and valve 64 will still close the nozzle 65. Accordingly, diaphragm 76 will remain expanded and switches 94 and 107 closed. Thus, switch 105 will remain closed and the foregoing cycle of operation will be repeated as many times as is required to reduce the speed of drive motor 19 sufficiently to reduce the volume of feed delivered to belt 30. By this manner of intermittently operating the control motor 92, the speed of variable drive motor 19 is corrected step-wise so as to avoid over-correcting in either direction.

In the event that the feeding mechanism 10 deposits the material 12 upon the conveyor belt 30 in quantity less than that desired, frame 46 and scale beam 54 will be rotated in a clockwise direction and valve 64 will be brought into closing contact with nozzle 66. The increased air pressure provided through pipe 74 and needle valve 73 to pipe 71 will thereby actuate diaphragm 82 to close switches 99 and 108 in the manner similar to the operation of diaphragm 76 described hereinbefore. In this instance switch 108 completes the circuit of the delay solenoid 106 while switch 99 completes the circuit of the forward winding 98 of control motor 92, eventually through microswitches 96 and 97, to adjust the variable resistance 100 in the direction to increase the speed of variable drive motor 19.

In the illustration of Figure 1, the material dispensed from feeder 10 is shown to constitute wood fibers 12 which are conveyed in precise quantity along the belt 30 to the apparatus at which the resinous binding material is to be added. Accordingly, there is shown in Figure 1 adjacent the forward roll 32 a second combing roll 130 driven by motor 131. This combing roll functions to shred the fiber mat carried on the belt 30 and to thus deliver the individual fibers to the inlet chute 132 of the resin mixer at a uniform rate.

Referring now to Figure 3 of the drawings, the modification illustrated therein provides an alternative means for achieving the desired delay in actuating the control motor 92 and timer motor 104. In this system the aforementioned delay solenoid 106 and related parts and delay switch 105 are omitted. The desired time delay is achieved by the provision of a storage tank 135 connected through pipe 136 to pipe 67 leading to nozzle 65 and a similar tank 137 connected through pipe 138 to pipe 71 leading to nozzle 66. Thus, when the scale beam valve 64 closes the opening of either nozzle 65 or 66 a time delay is involved in building up the air pressure from pipe 70 or 74 to a value sufficient to actuate the diaphragms 76 or 82, since time is required to build up the air pressure in the storage tanks 135 and 137, respectively. The amount of delay desired may be adjusted by providing various sizes of air storage tanks or by adjustment of the needle valves 69, 73.

Referring now to Figure 4 of the drawings, there is shown a further modification of the electrical circuitry and associated pneumatic actuating mechanism illustrated in Figure 2, wherein there is a substantially instantaneous response of the adjusting mechanism to closure of nozzles 65 or 66 by blade 64. In this modification the pipe 70 interconnecting the needle valve 68 with a source of compressed air is also connected through pipe 140 to a four-way valve 141. This valve is actuated by rod 142 connected to one side of a diaphragm 143, the compression spring 144 interposed between the valve and diaphragm functioning to maintain the valve in a normally closed position. The opposite side of the diaphragm 143 is connected by pipe 145 to pipe 67 leading from the needle valve 68 to nozzle 65.

The 4-way valve 141 is provided with an exhaust outlet 146 which communicates with pipe 147 leading from said valve to a second diaphragm 148. The opposite side of this diaphragm carries the actuating rod 149 which extends slidably through support member 150 and which is maintained in a normally retracted position by means of the coil spring 151, in the manner previously described.

In manner similar to the foregoing, pipe 74 interconnecting needle valve 72 with the source of compressed air is also connected through pipe 155 to the 4-way valve 156. This valve is actuated by means of rod 157 which is connected to one side of diaphragm 158. Compression spring 159 is interposed between the diaphragm and valve to normally maintain the valve in closed position. The opposite side of diaphragm 158 is connected through pipe 160 to the pipe 71 leading from needle valve 72 to the nozzle 66.

Four-way valve 156 is provided with an exhaust outlet 161 which communicates with pipe 162 which connects the four-way valve to one side of diaphragm 163. The opposite side of this diaphragm carries actuating rod 164 which extends slidably through support member 165 and is maintained in a normally retracted position by means of compression spring 166.

Switches 94 and 107 are actuated by means of relay 170 which is connected between the electrical supply terminals 90 and 91 through switch 171 which is controlled by the diaphragm rod 149. Switches 99 and 108 are controlled by relay 172 which is connected between terminals 90 and 91 through switch 173 controlled by the diaphragm rod 164.

The delay switch 105 is controlled by an electric delay mechanism 175 connected between terminals 90 and 91 through switches 107 and 108. This electric timer includes a cam 176 which is rotated at a predetermined adjustable speed, the cam having a projection 177 thereon adapted to engage the actuating rod 178 of switch 105 for purposes of closing the latter to complete the circuit of timer motor 104, in the manner previously described in connection with the modification of Figure 2. Various types of electrical delay devices are available commercially and form no part of the present invention, as far as their particular construction is concerned.

The operation of the mechanism illustrated in Figure 4 is as follows: With the deposit of excess material upon the endless belt 30, the scale beam valve 64 is elevated into contact with the open end of nozzle 65, as previously explained. Compressed air from pipe 70 thereby creates a pressure in pipe 145 against one side of diaphragm 143 sufficient to move the diaphragm rod 142 in the direction to open the four-way valve 141 and thereby interconnect pipes 70 and 147. The high air pressure in pipe 70 is thus instantly impressed upon diaphragm 148, whereupon the diaphragm rod 149 is rapidly extended and switch 171 is thereby instantly closed. Upon the closing of switch 171, relay 170 is energized and switches 94 and 107 are closed. Switch 107 closes the circuit of the electric delay 175 and thus the cams 176 begins to rotate at a predetermined adjusted speed to bring the cam projection 177 into contact with the switch rod 178 after a predetermined time delay.

The closing of switch 94 and the operation of timer motor 104 to operate cams 121 and 124 to close the electric circuit of the reverse winding 93 of control motor 92 to decrease the speed of the variable drive motor 19 is the same as described hereinbefore.

The operation of diaphragms 158 and 163 and related electrical circuitry to readjust the speed of drive motor 19 when the scale beam of valve 64 is lowered into contact with nozzle 66 when the deposit of material on the moving belt 30 is less than the predetermined amount required is substantially identical with the operation of diaphragms 143 and 148 described hereinabove.

From the foregoing description it is apparent that the present invention provides for the weighing of bulk materials in continuous transit with precision and speed. Novel means is provided to prevent over-correction in either direction of the feeding of material onto the weighing belt, whereby to insure greater precision of control than is afforded by apparatus of the prior art. The apparatus is of simplified construction and therefore inexpensive in cost. The apparatus is also of rugged construction, requiring a minimum of maintenance and repair. Furthermore, it is capable of adjustment between substantial limits, affording maximum sensitivity and accuracy in the delivery of materials which are ordinarily very difficult to weigh on a continuous basis.

It will be apparent to those skilled in the art that various changes in the structural details described hereinbefore may be made without departing from the scope and spirit of this invention. For example, control motor 92 may be utilized to drive a recording instrument in the event that it is desired merely to record the weight of materials carried upon the belt 30 rather than to control the weight of materials transported by the belt. In view of this and other changes and modifications it is to be understood that the foregoing description is primarily illustrative of the invention and is not to be considered as limiting the scope thereof.

Having now described my invention and the manner in which the same may be used, what I claim as new and desire to secure by Letters Patent is:

1. Apparatus for weighing material comprising conveyor means for receiving the material, support means for the conveyor means and movable in response to variations in weight of material carried thereon, an electrically actuated reversible motor and electric forward and reverse circuits therefor, switch means in the respective forward and reverse circuits, switch actuator means operable intermittently to close said switch means for a period of time less than the period of responsive movement of the conveyor support means, and actuating means operatively interconnecting the movable support means and the switch actuator means for selectively operating said switch means in response to movement of the support means whereby to selectively operate the reversible motor at the intermittent rate determined by the switch actuator means.

2. Apparatus for weighing material comprising conveyor means for receiving the material, a pivoted support for the conveyor means, an arm pivoted intermediate its ends and pivotally connected adjacent one end to the support, an electrically actuated reversible motor and electric forward and reverse circuits therefor, first switch means in the respective forward and reverse circuits, second switch means in both forward and reverse circuits, actuator means for the second switch means and operable to close the second switch means for a time less than the closing of the first switch means, and actuating means operatively interconnecting the pivoted arm and the first switch means for selectively operating said switch means in response to movement of the arm whereby to selectively operate the reversible motor at the intermittent rate determined by the actuation of the second switch means.

3. Apparatus for weighing material continuously, comprising continuously movable conveyor means for receiving the material, support means for the conveyor means and movable in response to variations in weight of material carried thereon, an electrically actuated reversible motor and electric forward and reverse circuits therefor, first switch means in the respective forward and reverse circuits, second switch means in both forward and reverse circuits, actuator means for the second switch means and operable to close the second switch means for a time less than the closing of the first switch means, and pneumatic actuating means operatively interconnecting the movable support means and the first switch means for selectively operating said switch means in response to movement of the support means whereby to selectively operate the reversible motor at the intermittent rate determined by the actuation of the second switch means.

4. Apparatus for weighing material comprising conveyor means for receiving the material, support means for the conveyor means and movable in response to variations in weight of material carried thereon, an electrically actuated reversible motor and electric forward and reverse circuits therefor, first switch means in the respective forward and reverse circuits, second switch means in both said circuits, an electrically actuated timer motor and an electric circuit therefor, third switch means in the timer motor circuit, cam means on the timer motor for intermittently operating the second switch means, and actuating means operatively interconnecting the movable support means and the first and third switch means for selectively operating said switch means in response to movement of the support means whereby to selectively operate the reversible motor at the intermittent rate determined by the timer motor.

5. Apparatus for weighing material comprising conveyor means for receiving the material, support means for the conveyor means and movable in response to variations in weight of material carried thereon, an electrically actuated reversible motor and electric forward and reverse circuits therefor, first switch means in the respective forward and reverse circuits, second switch means in both said circuits, an electrically actuated timer motor and an electric circuit therefor, third switch means in the timer motor circuit, fourth switch means in parallel with the third switch means, cam means on the timer motor for intermittently operating the second and fourth switch means, and actuating means operatively interconnecting the movable support means and the first switch means for selectively operating said switch means in response to movement of the support means whereby to selectively operate the reversible motor at the intermittent rate determined by the timer motor.

6. Apparatus for weighing material comprising conveyor means for receiving the material, support means for the conveyor means and movable in response to variations in weight of material carried thereon, an electrically actuated reversible motor and electric forward and reverse circuits therefor, first switch means in the respective forward and reverse circuits, second switch means in both said circuits, an electrically actuated timer motor and an electric circuit therefor, third switch means in the timer motor circuit, fourth switch means in parallel with the third switch means, electrically actuated delay means and an electric circuit therefor for operating the third switch means, fifth switch means in the last named electric circuit, cam means on the timer motor for intermittently operating the second and fourth switch means, and actuating means operatively interconnecting the movable support means and the first and fifth switch means for selectively operating said switch means in response to movement of the support means whereby to selectively operate the reversible motor at the intermittent rate determined by the timer motor.

7. Apparatus for weighing material continuously comprising continuously movable conveyor means for receiving the material, support means for the conveyor means and movable in response to variations in weight of material carried thereon, an electrically actuated reversible motor and electric forward and reverse circuits therefor, first switch means in the respective forward and reverse circuits, second switch means in both said circuits, an electrically actuated timer motor and an electric circuit thereof, third switch means in the timer motor circuit, fourth switch means in parallel with the third switch means, cam means on the timer motor for intermittently operating the second and fourth switch means, a pneumatic diaphragm associated with each first switch means for actuating said switch means selectively, a source of pneumatic power, conduit means connecting the latter to the diaphragms, opposed nozzle means normally opening said diaphragms to the atmosphere, and sealing valve means actuated by the movable support means and positioned adjacent the opposed nozzle means for selectively closing the latter, whereby to actuate the corresponding diaphragm and switch means to operate the motor in response to movement of the support means at the intermittent rate determined by the timer motor.

8. The apparatus of claim 7 including means responsive to the closing of each nozzle to delay the actuation of the third switch means.

9. The apparatus of claim 7 including reservoir means connected to the conduit means for delaying the actuation of the diaphragms.

10. Apparatus for controlling the feed rate of material comprising, in combination with an electrically actuated variable feeder and means for varying the latter; continuously movable conveyor means for receiving the material from the feeder, support means for the conveyor means and movable in response to variations in weight of material carried thereon, an electrically actuated reversible control motor and electric forward and reverse circuits therefor, means connecting the control motor to the feed varying means of the feeder, switch means in the respective forward and reverse circuits, switch actuator means operable intermittently to close said switch means for a period of time less than the period of responsive movement of the conveyor support means, and actuating means operatively interconnecting the movable support means and the switch actuator means for selectively operating said switch means in response to movement of the support means whereby to selectively operate the reversible control motor and regulate the feeder at the intermittent rate determined by the switch actuator means.

11. Apparatus for controlling the feed rate of material comprising, in combination with an electrically actuated variable feeder and means for varying the latter; continuously movable conveyor means for receiving the material from the feeder, a pivoted support for the conveyor means, an arm pivoted intermediate its ends and pivotally connected adjacent one end to the support, an electrically actuated reversible control motor and electric forward and reverse circuits therefor, means connecting the control motor to the feed varying means of the feeder, switch means in the respective forward and reverse circuits, switch actuator means operable intermittently to close said switch means for a period of time less than the period of responsive movement of the conveyor support, and actuating means operatively interconnecting the pivoted arm and the switch actuator means for selectively operating said switch means in response to movement of the arm whereby to selectively operate the reversible control motor and regulate the feeder at the intermittent rate determined by said actuator means.

12. Apparatus for controlling the feed rate of material comprising, in combination with an electrically actuated variable feeder and means for varying the latter; continuously movable conveyor means for receiving the material from the feeder, support means for the conveyor means and movable in response to variations in weight of material carried thereon, an electrically actuated reversible control motor and electric forward and reverse circuits therefor, means connecting the control motor to the feed varying means of the feeder, switch means in the responsive forward and reverse circuits, switch actuator means operable intermittently to close said switch means for a period of time less than the period of responsive movement of the conveyor support means, and pneumatic actuating means operatively interconnecting the movable support means and the switch actuator means for selectively operating said switch means in response to movement of the support means whereby to selectively operate the reversible control motor and regulate the feeder at the intermittent rate determined by the switch actuator means.

13. Apparatus for controlling the feed rate of material comprising, in combination with an electrically actuated variable feeder and means for varying the latter; continuously movable conveyor means for receiving the material from the feeder, support means for the conveyor means and movable in response to variations in weight of material carried thereon, an electrically actuated reversible control motor and electric forward and reverse circuits therefor, means connecting the control motor to the feed varying means of the feeder, first switch means in the respective forward and reverse circuits, second switch means in both said circuits, an electrically actuated timer motor and an electric circuit therefor, third switch means in the timer motor circuit, cam means on the timer motor for intermittently operating the second switch means, and actuating means operatively interconnecting the movable support means and the first and third switch means for selectively operating said switch means in response to movement of the support means whereby to selectively operate the reversible control motor and regulate the feeder at the intermittent rate determined by the timer motor.

14. Apparatus for controlling the feed rate of material comprising, in combination with an electrically actuated variable feeder and means for varying the latter; continuously movable conveyor means for receiving the material from the feeder, support means for the conveyor means and movable in response to variations in weight of material carried thereon, an electrically actuated reversible control motor and electric forward and reverse circuits therefor, means connecting the control motor to the feed varying means of the feeder, first switch means in the respective forward and reverse circuits, second switch means in both said circuits, an electrically actuated timer motor and an electric circuit therefor, third switch means in the timer motor circuit, fourth switch means in parallel with the third switch means, cam means on the timer motor for intermittently operating the second and fourth switch means, and actuating means operatively interconnecting the movable support means and the first and third switch means for selectively operating said switch means in response to movement of the support means whereby to selectively operate the reversible control motor and regulate the feeder at the intermittent rate determined by the time motor.

15. Apparatus for controlling the feed rate of material comprising, in combination with an electrically actuated variable feeder and means for varying the latter; continuously movable conveyor means for receiving the material from the feeder, support means for the conveyor means and movable in response to variations in weight of material carried thereon, an electrically actuated reversible control motor and electric forward and reverse circuits therefor, means connecting the control motor to the feed varying means of the feeder, first switch means in the respective forward and reverse circuits, second switch means in both said circuits, an electrically actuated timer motor and an electric circuit therefor, third switch means in the timer motor circuit, fourth switch means in parallel with the third switch means, electrically actuated delay means and an electric circuit therefor for operating the third switch means, fifth switch means in the last named electric circuit, cam means on the timer motor for intermittently operating the second and fourth switch means, and actuating means operatively interconnecting the movable support means and the first and fifth switch means for selectively operating said switch means in response to movement of the support means whereby to selectively operate the reversible control motor and regulate the feeder at the intermittent rate determined by the timer motor.

16. Apparatus for controlling the feed rate of material comprising, in combination with an electrically actuated variable feeder and means for varying the latter; continuously movable conveyor means for receiving the material from the feeder, support means for the conveyor means and movable in response to variations in weight of material carried thereon, an electrically actuated reversible control motor and electric forward and reverse circuits therefor, means connecting the control motor to the feed varying means of the feeder, first switch means in the respective forward and reverse circuits, second switch means in both said circuits, an electrically actuated timer motor and an electric circuit therefor, third switch means in the timer motor circuit, cam means on the timer motor for intermittently operating the second switch means, a pneumatic diaphragm associated with each first switch means for actuating said switch means selectively, a source of pneumatic power, conduit means connecting the latter to the diaphragms, opposed nozzle means normally opening said diaphragms to the atmosphere, and sealing valve means actuated by the movable support means and positioned adjacent the opposed nozzle means for selectively closing the latter, whereby to actuate the corresponding diaphragm and switch means to operate the control motor in response to movement of the support means and regulate the feeder at the intermittent rate determined by the timer motor.

17. The apparatus of claim 16 including means responsive to the closing of each nozzle to delay the actuation of the third switch means.

18. The apparatus of claim 16 including reservoir means connected to the conduit means for delaying the actuation of the diaphragms.

19. Apparatus for controlling the feed rate of material comprising, in combination with an electrically actuated variable feeder and means for varying the latter; continuously movable conveyor means for receiving the material from the feeder, support means for the conveyor means and movable in response to variations in weight of material carried thereon, an electrically actuated reversible control motor and electric forward and reverse circuits therefor, means connecting the control motor to the feed varying means of the feeder, first switch means in the respective forward and reverse circuits, second switch means in both said circuits, an electrically actuated timer motor and an electric circuit therefor, third switch means in the timer motor circuit, fourth switch means in parallel with the third switch means, electrically actuated delay means and an electric circuit therefor for operating the third switch means, fifth switch means in the last named electric circuit, cam means on the timer motor for intermittently operating the second and fourth switch means, a pneumatic diaphragm associated with each first switch means for actuating said switch means selectively, a source of pneumatic power, conduit means connecting the latter to the diaphragms, opposed nozzle means normally opening said diaphragms to the atmosphere, and sealing valve means actuated by the movable support means and positioned adjacent the opposed nozzle means for selectively closing the latter, whereby to actuate the corresponding diaphragm and switch means to operate the control motor in response to movement of the support means and regulate the feeder at the intermittent rate determined by the timer motor.

20. Apparatus for controlling the feed rate of material comprising, in combination with an electrically actuated variable feeder and means for varying the latter; continuously movable conveyor means for receiving the material from the feeder, a pivoted support for the conveyor means, an arm pivoted intermediate its ends and pivotally connected adjacent one end to the support, an electrically actuated reversible control motor and electric forward and reverse circuits therefor, means connecting the control motor to the feed varying means of the feeder, first switch means in the respective forward and reverse circuits, second switch means in both said circuits, an electrically actuated timer motor and an electric circuit therefor, third switch means in the timer motor circuit, fourth switch means in parallel with the third switch means, cam means on the timer motor for intermittently operating the second and fourth switch means, a pneumatic diaphragm associated with each first switch means and third switch means for actuating said switch means selectively, a source of pneumatic power, conduit means connecting the latter to the diaphragms, opposed nozzle means normally opening said diaphragms to the atmosphere, sealing valve means on the free end of the pivoted arm and positioned adjacent the opposed nozzle means for selectively closing the latter, whereby to actuate the corresponding diaphragm and switch means to operate the control motor in response to movement of the arm and regulate the feeder at the intermittent rate determined by the timer motor, and means responsive to the closing of each nozzle to delay the actuating of the third switch means.

21. Apparatus for feeding bulk material at a predetermined rate, comprising, in combination with a variable feeder and means for varying the latter; continuously movable conveyor means for receiving the material from the feeder, support means for the conveyor means and movable in response to variations in weight of materials carried thereon, and actuating means operatively interconnecting the movable support and feeder varying means and operable by movement of the support means in response to variations in weight of material deposited on the conveyor means to vary the feeder in the direction to return the feed rate toward the predetermined value, the actuating means being operable in predetermined intermittent timed sequence and at such a rate that the feed rate of material from the feeder is varied in stepwise increments of smaller magnitude than the weight variation.

References Cited in the file of this patent

UNITED STATES PATENTS

| | | |
|---|---|---|
| 1,686,502 | Richardson | Oct. 2, 1923 |
| 2,098,246 | Jarrier | Nov. 9, 1937 |
| 2,261,655 | Lowe | Nov. 4, 1941 |
| 2,276,383 | Francis | Mar. 17, 1942 |
| 2,354,431 | Bosomworth | July 25, 1944 |
| 2,357,860 | Whitaker | Sept. 12, 1944 |
| 2,622,766 | Simon | Dec. 23, 1952 |
| 2,634,082 | Knobel | Apr. 7, 1953 |
| 2,637,434 | Harper | May 5, 1953 |
| 2,645,447 | Clark | July 14, 1953 |
| 2,650,058 | Read | Aug. 25, 1953 |
| 2,702,177 | Jee et al. | Feb. 15, 1955 |
| 2,796,197 | Criddle | June 18, 1957 |

FOREIGN PATENTS

| | | |
|---|---|---|
| 916,473 | Germany | Aug. 12, 1954 |

OTHER REFERENCES

Figs. 6–9 and 6–15 of "Industrial Weighing," by Douglas M. Considine, published 1948 by Reinhold Publishing Corp., West 42nd Street, New York.

Luginsland et al.: Ser. No. E8586, Nov. 17, 1955 (K164b10) (German).